United States Patent [19]

Cieslak et al.

[11] Patent Number: 5,475,813
[45] Date of Patent: Dec. 12, 1995

[54] ROUTING TRANSACTIONS IN THE PRESENCE OF FAILING SERVERS

[75] Inventors: Randall A. Cieslak, Scarsdale; Donald F. Ferguson, Yorktown Heights; Jakka Sairamesh, New York, all of N.Y.

[73] Assignee: International Business Machines Corporation, Armonk, N.Y.

[21] Appl. No.: 277,377

[22] Filed: Jul. 18, 1994

[51] Int. Cl.$^6$ ..................................... G06F 11/34
[52] U.S. Cl. ................ 395/182.02; 395/182.05; 379/221; 371/5.1
[58] Field of Search ................ 395/575; 371/7, 371/4, 5.1; 379/273, 219, 220, 221, 273; 370/16, 5.1

[56] References Cited

U.S. PATENT DOCUMENTS

| | | | |
|---|---|---|---|
| 4,616,359 | 10/1986 | Fontenot | 370/60 |
| 4,881,261 | 11/1989 | Oliphant et al. | 379/215 |
| 5,031,089 | 7/1991 | Liu et al. | 364/200 |
| 5,095,421 | 3/1992 | Freund | 364/222.81 |
| 5,185,780 | 2/1993 | Leggett | 379/34 |
| 5,224,099 | 6/1993 | Corbalis et al. | 370/94.2 |
| 5,267,235 | 11/1993 | Thacker | 370/85.8 |
| 5,291,550 | 3/1994 | Levy et al. | 379/242 |
| 5,313,454 | 5/1994 | Bustini et al. | 370/13 |
| 5,317,562 | 5/1994 | Nardin et al. | 370/16 |
| 5,335,224 | 8/1994 | Cole et al. | 370/84 |

*Primary Examiner*—Robert W. Beausoliel, Jr.
*Assistant Examiner*—Albert Decady
*Attorney, Agent, or Firm*—Whitham, Curtis, Whitham & McGinn; Richard M. Ludwin

[57] ABSTRACT

Failures are detected in servers of a transaction processing system, and transactions are routed to less failure prone servers in the system. Servers in the transaction processing system which are faulty for some transaction classes but good for others are detected, and such servers are used in a judicious manner to maximize the throughput and minimize the response time of the system. Error prone servers are occasionally probed to determine if they have improved in terms of their error characteristics. The mechanism implemented consists of three elements. The first is the selection of a routing algorithm based on the state of the transaction processing system. Second, transactions are used to probe systems considered too faulty for use in order to determine if they have improved in terms of their failure characteristics. Finally, soft ABENDs are detected. The algorithm for transaction routing to detect and control the problem of failing servers in a transaction processing system consists of two parts: The first part routes transactions to servers based on the length of the server queues, the response time of the transactions (i.e., queuing delay plus processing delay), and the perceived failure rate. The second part of the algorithm ensures that error prone servers are not completely ignored. Occasional transactions are used to probe servers in order to determine if they have improved in terms of their error characteristics.

9 Claims, 9 Drawing Sheets

ROUTING TRANSACTIONS IN THE PRESENCE OF FAILING SERVERS

CROSS REFERENCE TO RELATED APPLICATION

This invention disclosed in this application is related in subject matter to that disclosed in copending application entitled "Workload Manager for Achieving Transaction Class Response Time Goals in a Multiprocessing System," Ser. No. 07/876,670 filed on Apr. 30, 1992, by D. Ferguson, L. Georgiadis and C. Nikolaou and assigned to a common assignee. The subject matter of application Ser. No. 07/876, 670 is incorporated herein by reference.

DESCRIPTION

1. Field of the Invention

The present invention generally relates to transaction processing systems and, more particularly, to a mechanism for routing transactions to servers in a transaction processing system in which the servers may cause transaction failures.

2. Background of the Invention

A transaction processing system supervises the sharing of resources (e.g., servers or computer systems) for processing multiple transactions concurrently. Transaction processing systems are designed to support interactive applications in which requests submitted by users at terminals are processed as soon as they are received. Results are returned to the requester in a relatively short period of time. Examples of transaction processing systems are airline reservation systems, order processing systems and inventory control systems. A specific example of a transaction processing system is International Business Machines (IBM) Corporation's Airline Control Program (ACP) which, although classically used in airlines reservations systems, has been also used in other systems, notably by banks for on-line teller applications.

In a transaction processing system, transactions arrive at one of possibly many transaction routers and are routed to one of N servers (or computer systems), where they are to be processed. Transactions are grouped into transaction classes. Transactions in the same class have some characteristics in common. For example, airline reservation transactions could belong to a class. The computer systems in this environment are heterogenous in nature. They have different processing speeds, memory and disk resources, and operating systems. In such an environment, transactions of the same class will experience different response times (behavior) at each of the computer systems. They could also fail independently on each computer system due to several reasons such as lack of resources, protocol mismatches, and transient software errors. Also failures occur only on a small subset of the transactions routed to a computer system, which means that some transactions will finish successfully at these faulty computer systems due to their characteristics and some others will fail at these computer systems. Thus, a server (i.e., computer system) is faulty for some transaction classes and good for others.

FIG. 1 illustrates a simplified transaction processing system in which there is only one router and N servers, but the techniques described can be easily generalized to multiple routers. The transaction router routes transactions to one of the servers using an algorithm derived from a number of considerations. The following considerations are important:

1. Response time goals can be set for each transaction class.

2. The undesirability of failures may call for a routing algorithm that does not route transactions to a system judged to be unreliable because, for example, the most recent transactions routed to that system ended abnormally.

3. Load balancing considerations may lead to a routing algorithm based on the join the shortest queue (JSQ) algorithm. See, for example, A. Ephremides, P. Varaiya, and J. Walrand, "A simple dynamic routing problem", *IEEE Transactions on Automatic Control*, 25:690–693, 1980; R. Weber, "On the optimal assignment of customers to parallel servers", *Journal of Applied Probability*, 15:406–413, 1978; and W. Winston, "Optimality of the shortest line discipline", *Journal of Applied Probability*, 14:181–189, 1977. This algorithm distributes the load evenly across different servers by routing transactions to servers that have the fewest number of transactions queued for processing.

In practice, a server may begin to fail and cause abnormal ends (ABENDs) for transactions of a particular class of traffic. For example, the data needed by transactions of a particular class may be unavailable because of the disk where the dam resides exhibits input/output errors. Not all transactions in a class will access the unavailable data, and only a fraction of the transactions will fail. Typically, for each class, only a fraction of transactions routed to a faulty server fail. In general, ABENDs are reported to the router. (See point 4 below for an exception.) The existence of ABENDs introduces the following problems for the transaction router:

1. The response time for transactions that end abnormally is usually smaller than that for transactions that are processed to completion. Because of this, a faulty server will process transactions more quickly than an ABEND-free system (even though the transactions end abnormally), and a transaction router using an algorithm based on JSQ will thus send a disproportionally large number of transactions to a faulty server. This policy, in turn, will cause more transactions to ABEND.

2. ABENDs are undesirable in general and the router must be able to estimate the failure rate so that it can decide whether or not to route transactions to a particular server based on the likelihood of ABENDs.

3. A transaction router may decide to avoid a system because of the frequency of ABENDs in the most recent transactions routed to it. If the problem associated with this faulty server is resolved, then the router must have some way of recognizing a decrease in the failure rate. Otherwise, if the faulty server is avoided forever, then its processing potential is wasted, even if the server improves.

4. In some cases, a transaction may end abnormally at a server, but due to the complexity of the software at both the server and the router, the ABEND is reported in one place of the transaction processing system, such as the console, but a return code is sent to the router indicating a success. These ABENDs are called soft ABENDs and their presence must be detected. Soft ABENDs can be detected because of their unusual response time characteristics.

Previous routing algorithms have not dealt with these kinds of specific failures in the servers.

SUMMARY OF THE INVENTION

It is therefore an object of the present invention to provide a way to detect failures in servers of a transaction processing system and route transactions to less failure prone servers in the system.

It is another object of the invention to provide a method for detecting servers in a transaction processing system which are faulty for some transaction classes but good for others and to use such servers in judicious manner to maximize the throughput or minimize the response time of the system.

It is a further object of the invention to provide a transaction processing system in which error prone servers are occasionally probed to determine if they have improved in terms of their error characteristics.

According to the invention, there is provided a mechanism consisting of three elements. The first is the selection of a routing algorithm based on the state of the transaction processing system. Second, transactions are used to probe systems considered too faulty for use in order to determine if they have improved in terms of their failure characteristics. Finally, soft ABENDs are detected.

The algorithm for transaction routing to detect and control the problem of failing servers in a transaction processing system according to a preferred embodiment of the invention consists of two parts: The first part routes transactions to servers based on the length of the server queues, the response time of the transactions (i.e., queuing delay plus processing delay), and the perceived failure rate. The second part of the algorithm ensures that error prone servers are not completely ignored. Occasional transactions are used to probe servers in order to determine if they have improved in terms of their error characteristics. Simulation and experimental results show that the new algorithms reduce the number of transaction failures per class compared to the join the shortest queue (JSQ) algorithm.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION AND BEST MODE FOR PRACTICING THE INVENTION

Figure 1:
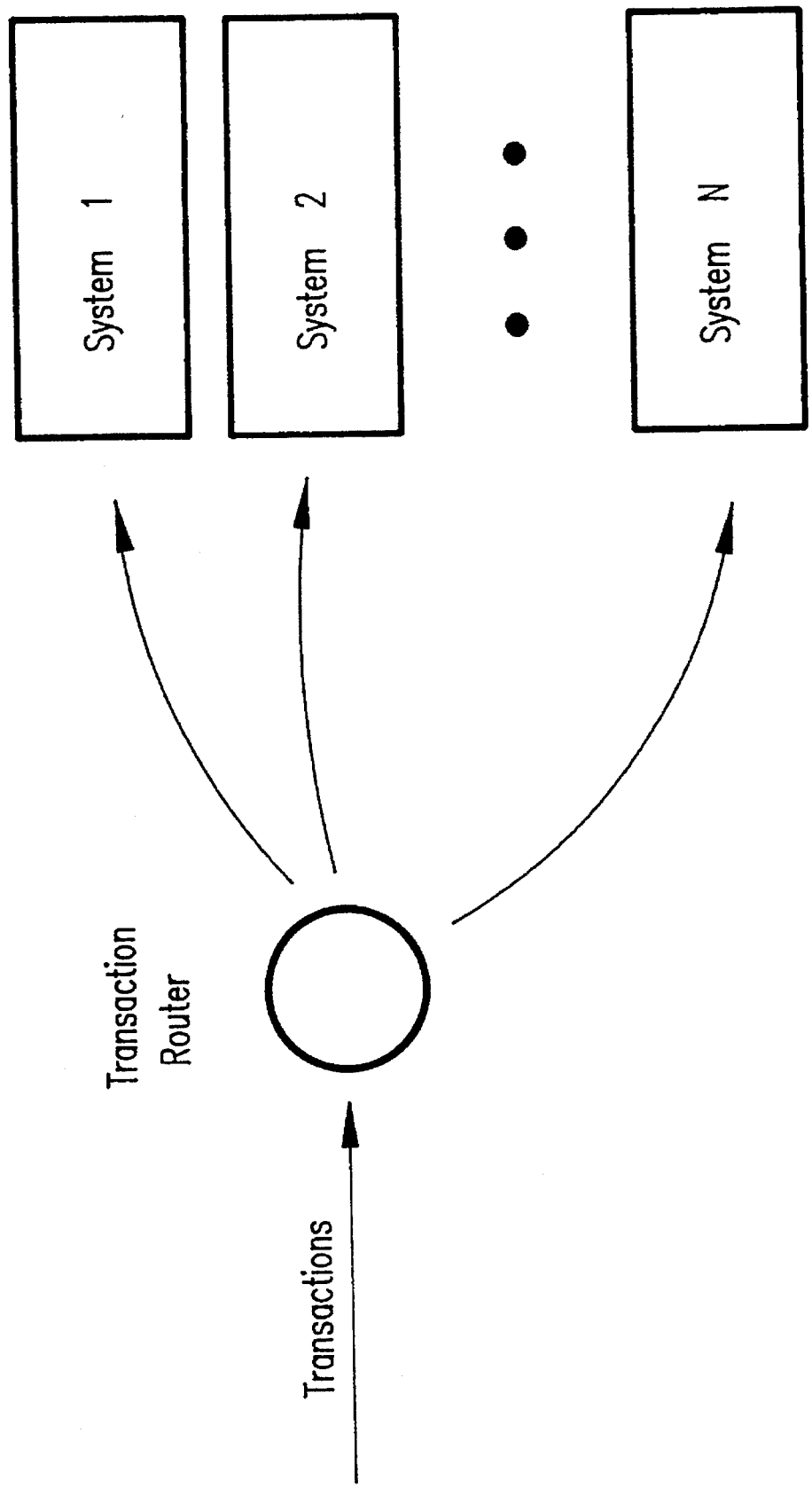
FIG. 1 is a schematic diagram illustrating a generalized transaction processing system employing a single transaction router.
Figure 2:
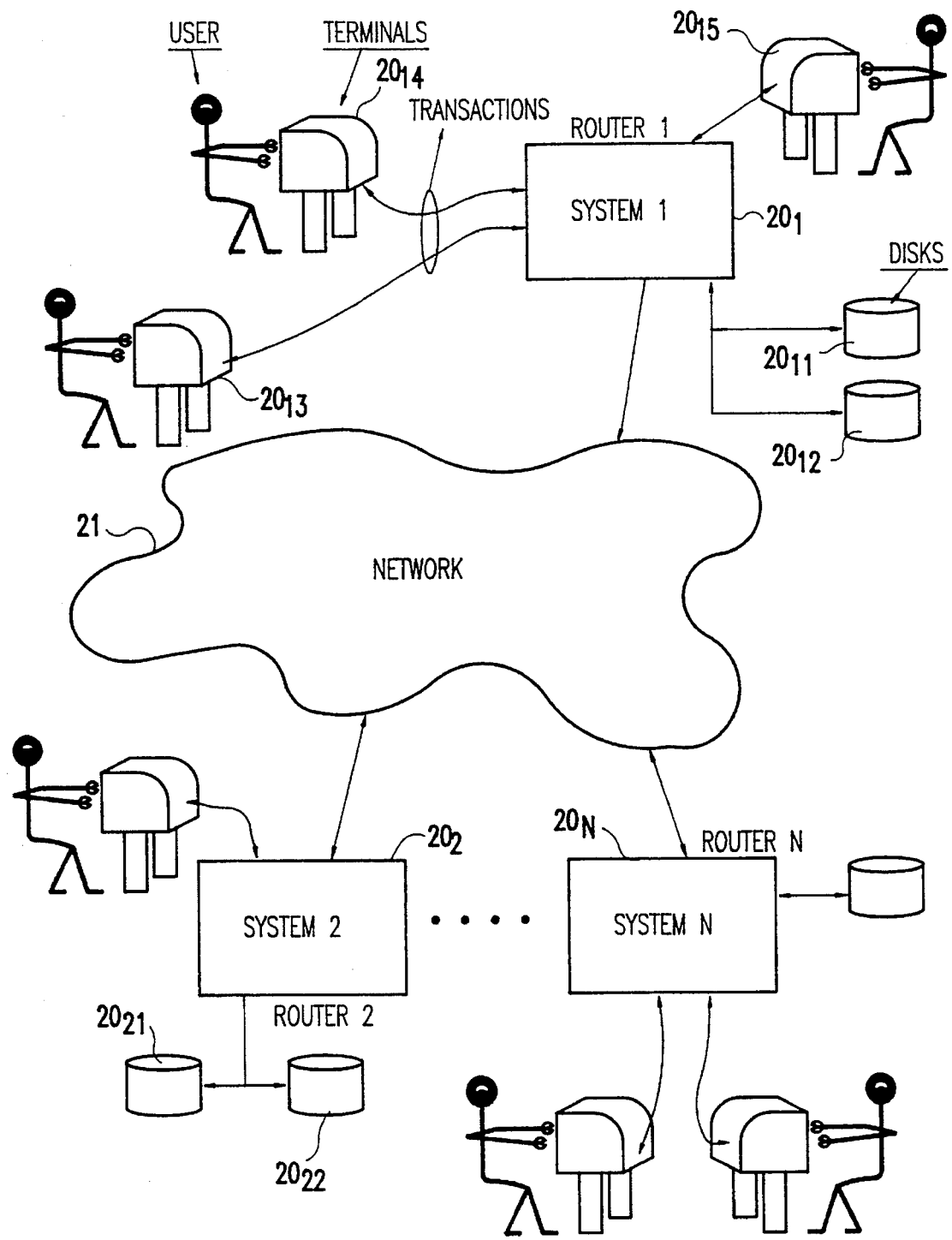
FIG. 2 is a schematic diagram illustrating in more detail a transaction processing system in a network environment using multiple transaction routers.

Referring again to the drawings, and more particularly to FIG. 2, there is shown in more detail a typical transaction processing system such as, for example, IBM's ACP on which the subject invention may be implemented. This is a multiprocessing system comprising a plurality of computer systems $20_1, 20_2, \ldots, 20_n$ connected by a network 21. The computer systems, or servers, may be micro, mini or mainframe computer systems, and the network may be a local area network (LAN), wide area network (WAN), such as a T1/T3 telecommunications network, or a combination of LANs and WAN. Each of these computer systems access and store data in memory and on direct access storage devices (DASDs) attached to the computer systems. The DASDs provide storage for one or more databases which are accessed for reads and updates during a transaction. These DASDs may be, for example, disk drives $20_{11}$ and $20_{12}$ shown attached to computer system $20_1$, disk drives $20_{21}$ and $20_{22}$ shown attached to computer system $20_2$, and so forth. Each of the computer systems also have attached a plurality of terminals by which users input various transactions. Thus, for example, terminals $20_{13}$, $20_{14}$ and $20_{15}$ are shown attached to computer system $20_1$. These terminals may be smart terminals capable of local processing, such as personal computers similar to IBM's PS/2 personal computers, or so-called dumb terminals, such as IBM 3278 terminals. Each transaction generally processes user input data, performs reads and updates against one or more databases, executes application code and returns results to the user. There may be multiple interactions between a user and an executing program. The basic function and operation of transaction processing systems of the type illustrated in FIG. 2 is well understood in the art, and further information may be had by reference to one of the standard text books, such as C. J. Date, *An Introduction to Database Systems*, vol. 2, Addison-Wesley Co. (1983).

Figure 3:
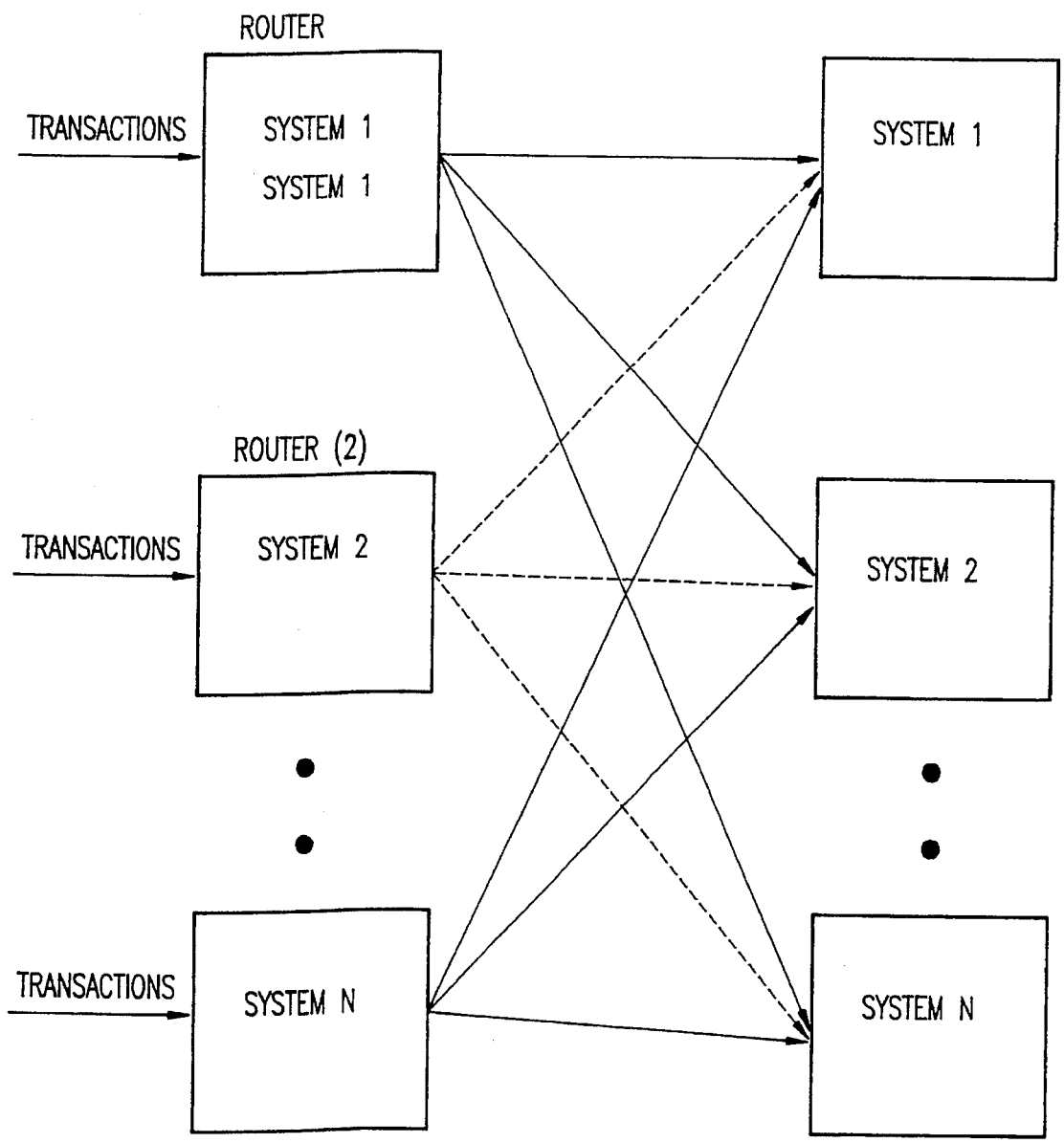
FIG. 3 is a block diagram showing the relationships of the several routers and systems of the transaction processing system of FIG. 2.

FIG. 3 shows in simplified block diagram form the relationships between the several routers and computer systems of the transaction processing system shown in FIG. 2. Observe that each computer system may be a server to every other computer system, including itself. Thus, router 1 at computer system 1 receives transactions and routes the transactions according to some algorithm to one of the several available computer systems 1 to N. Similarly, router 2 at computer system 2 receives transactions and routes these transactions according to an algorithm to one of the computer systems 1 to N.

The invention is a mechanism for routing transactions in the presence of faulty systems such that:

A routing algorithm is selected based on the state of the systems. The state here minimally includes the number of transactions of each class waiting at each system, the estimated failure probabilities for the different transaction classes and systems, and the estimated arrival rate for each transaction class.

A mechanism is available for detecting a decrease in the failure rate of systems that the router may be ignoring because the systems cause an intolerable number of failures.

A presence of soft ABENDs is detected.

In order to accomplish these objectives, the transaction router receives the following inputs:

Transactions with the class identified.

A response from the system that processed the transaction indicating the return code of the transaction.

Figure 4:
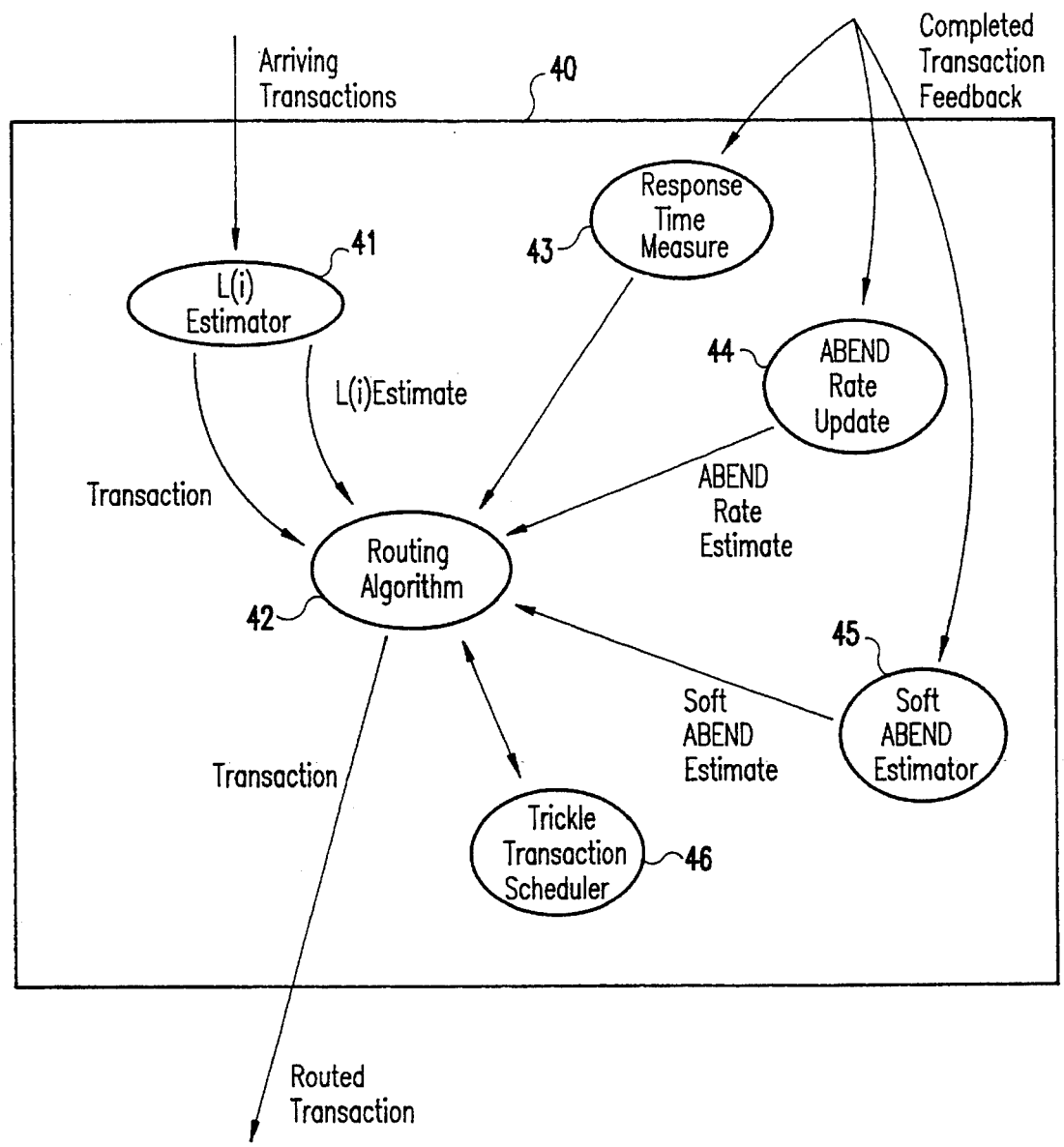
FIG. 4 is a functional block diagram showing the logic of a transaction router according to the invention.

FIG. 4 shows the logic of a transaction router according to the invention. The router 40 has as one input arriving transactions and as second inputs completed transaction feedback from the servers (i.e., computer systems). Based on these inputs and the internal statistical analyses performed by the router, the arriving transactions are routed to specific ones of the servers.

The arriving transactions are input to an arrival rate estimator 41 which outputs the arrival rate estimate, L(i), and the transaction to the routing algorithm 42. The completed transaction feedback is inputted to the response time measure 43, the ABEND rate update 44, and the soft ABEND estimator 45. The response time measure, the ABEND rate estimate and the soft ABEND estimate are each input to the routing algorithm 42. In addition, the routing algorithm 42 communicates with the trickle transaction scheduler 46. Each of these are discussed in more detail below.

The transaction router 40 monitors H(i,j), the number of class i transactions queued at system j. Let N(i) be the total number of class i transactions queued at all systems, and Q(j) be the number of transactions of all classes queued at system j. In addition, the transaction router 40 maintains an estimate of the following quantities:

F(i,j)=the probability that a class i transaction will ABEND if routed to system j. The estimate of F(i,j) is based on the success or failure of previous transactions and updated upon the completion of a class i transaction T at system j.

L(i)=the arrival rate of class i.

The algorithm below is a specific example of a mechanism that accomplishes the objectives stated above.

ALGORITHM

In this algorithm,

Response time goals are met without using systems that cause ABENDs, if possible.

If the above condition is not possible, transactions are routed to systems in such a way that systems are favored if they are less ABEND prone.

The system administrator must define several parameters for the algorithm:

The parameter $\alpha$, defined below.

For i=1, . . . , let G(i) be the goal for class i. G(i) is interpreted as the average response time.

LFT is the low failure threshold. If F(i,j)<LFT, then system j is considered error free for class i transactions.

HFT is the high failure threshold. If F(i,j)>HFT, then system j is considered inoperable for class i transactions, and the transaction router will not send any class i transactions them.

The estimate of F(i,j) is updated at the completion of each transaction and depends on a parameter specified by the user, $\alpha$, $0 \leq \alpha \leq 1$. The new estimate, F'(i,j) is $$F'(i,j)=F(i,j)*(1-\alpha)$$

if T completes successfully, and $$F'(i,j)=F(i,j)*(1-\alpha)+\alpha$$

if T fails.

Figure 5:
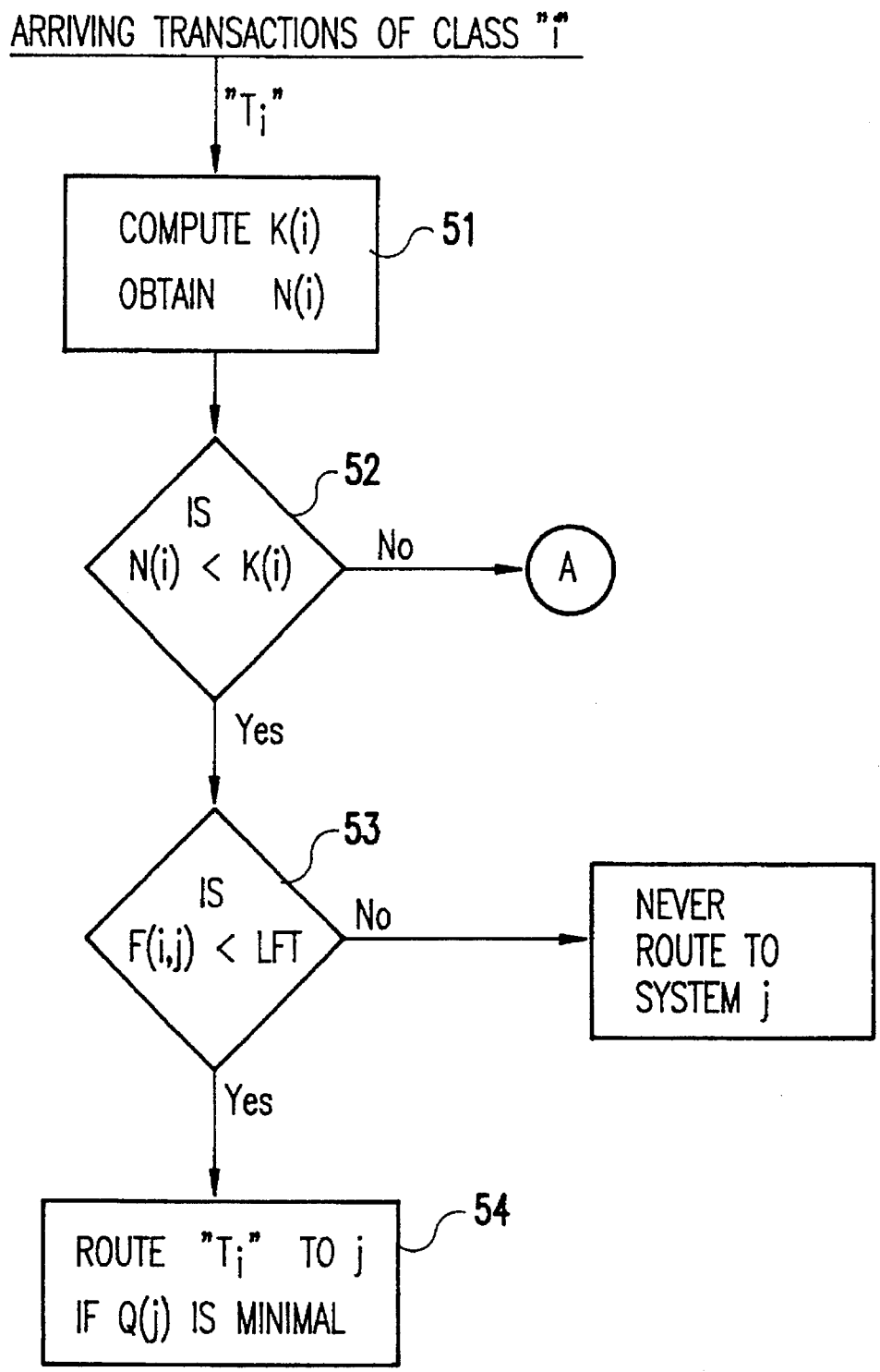
FIG. 5 is a flow diagram of the logic of the basic algorithm implemented by the invention.
Figure 6:
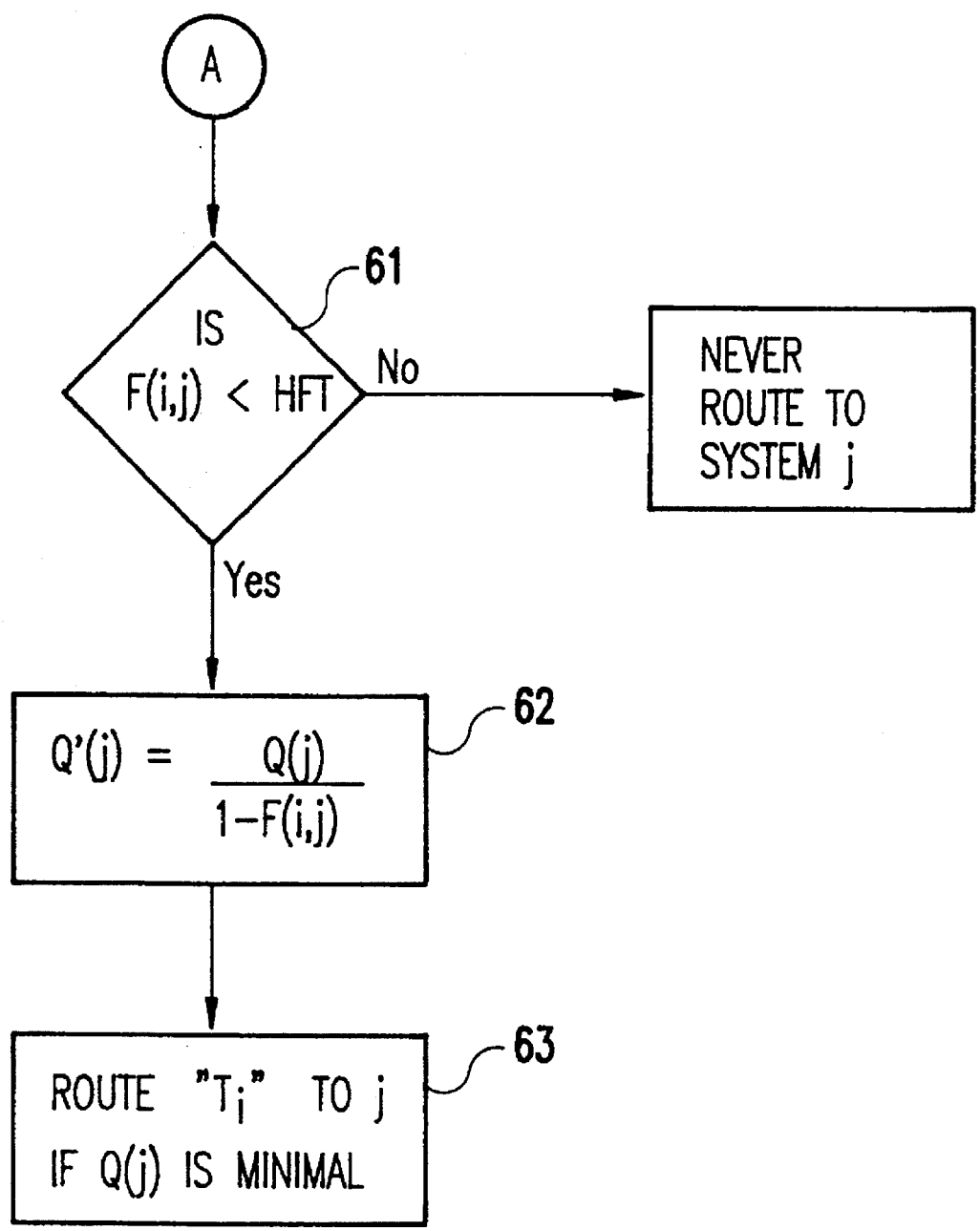
FIG. 6 is a flow diagram of the logic of the compensation algorithm implemented by the invention.

With reference to the flow diagrams of FIGS. 5 and 6, assume that a class i transaction has just arrived at the transaction router 40. The algorithm operates as follows. In function block 51 of FIG. 5, K(i) is computed as K(i)=L(i)*G(i). K(i) is the safe number of class i transactions in the transaction processing system. If the actual number of class i transactions exceeds K(i), then the response time goal G(i) for class i transactions will not be met. This conclusion follows from Little's Law, a discussion of which can be found in *Queuing Systems, vol. 1: Theory*, by L. Kleinrock, published by John Wiley and Sons Inc. (1975).

X(i) is then obtained as the number of systems such that F(i,j)<LFT.

In decision block 52, a test is made to determine if N(i)<K(i). If not, the process exits to the flow diagram of FIG. 6 discussed in more detail below, but if so, a further test is made in decision block 53 to determine for each system j if F(i,j)<LFT. If not, no transactions are routed to system j, but if so, the transaction T is routed to system j in function block 54 such that Q(j) is minimal, i.e., system j has the shortest queue. In this case, the routing algorithm can still meet the overall goals while avoiding systems with F(i,j)≧LFT.

If N(i)≧K(i) as determined in decision block 52, the algorithm can no longer avoid ABEND prone systems. In this case, the routing algorithm is modified as shown in FIG. 6. First, a test is made in decision block 61 to determine if F(i,j)<HFT. If not, no transactions are routed to system j. Then, in function block 62, Q'(j) is computed for each system j with F(i,j)<HFT where $$Q'(j)=Q(j)$$

if F(i,j)<LFT and $$Q'(j) = \frac{Q(j)}{1-F(i,j)}$$

if not. Then, in function block 63, the transaction T is routed to system j such that Q'(j) is minimal. The transaction router never routes transactions of class i to system j if F(i,j)≧HFT.

TRICKLE TRANSACTIONS

There are two cases in which the transaction scheduler 46, using the algorithm above, will not route a transaction of class i to system j:

N(i)≦K(i) and LFT≦F(i,j)<HFT, and

F(i,j)≧HFT.

In the first case, system j is being avoided because the goals for class i can be met without using system j, which has a failure rate greater than the low failure threshold. In the second case, system j is being avoided because its failure probability is intolerably high, i.e., greater than the high failure threshold. In both cases, the router avoids the system in order to reduce the number of ABENDs. However, once a router begins to avoid a system, it will always avoid the system unless it receives some notice that the system's failure rate has decreased. If the router receives this information, it can then begin to use previously failed systems again, so that the transaction processing system can operate with lower response times.

Figure 7:
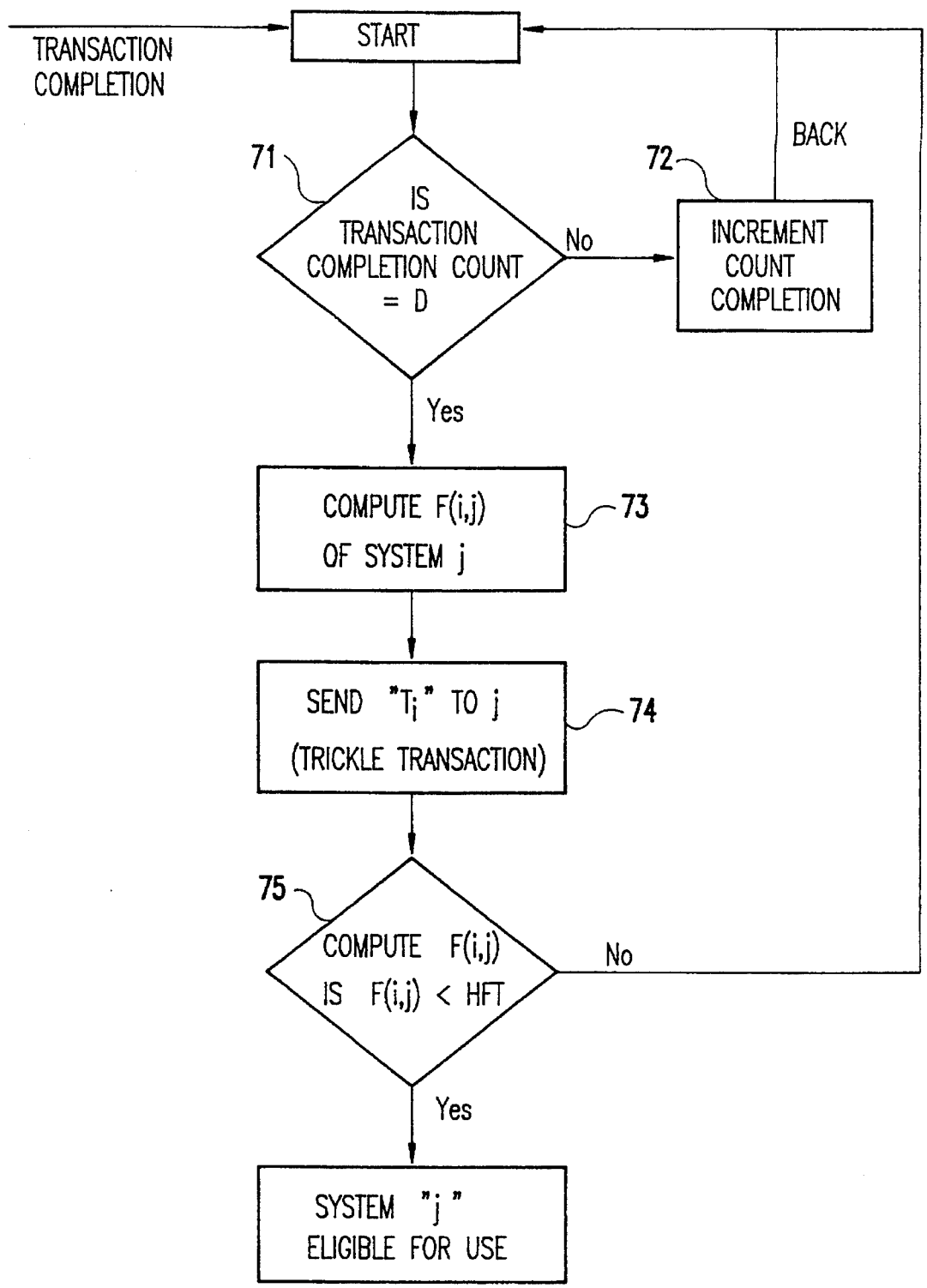
FIG. 7 is a flow diagram of the logic of the system recovery process implemented by the invention.

In the case that a system j is avoided by a router, the router can probe the system in its processing of class i transactions in order to determine if the failure probability has decreased. The flow diagram of FIG. 7 illustrates a possible system recovery process. D is set as predetermined number of transactions completions from the time that the router has stopped routing transactions to system j. In decision block 71 a test is made to determine whether a transaction completion count equals the preset number D, and if not, the count is incremented in function block 72. When the preset count D is reached, the router recomputes F(i,j) as if a successful transaction has completed in function block 73. As F(i,j) becomes smaller, the router will eventually route a transaction of class i to system j. This transaction is called a trickle transaction.

The above mentioned algorithm performs as if the failure probability for a particular system and transaction class will decrease in time. However, if the algorithm inaccurately estimates that the failure probability has decreased, then the trickle transaction may be exposed to a probability of failure that is greater than what is expected. The trickle transaction is exposed to this failure so that information can be gathered about the failing system. If the trickle transaction fails, the router updates F(i,j) as in FIG. 4.

SOFT ABEND DETECTION

In some cases, a system may return a return code to the router that indicates success for a transaction that has actually failed. This can happen because at the point of failure, the software architecture does not propagate the abnormal end information to the router. For example, an error message may be displayed on the console. This type of ABEND is called a soft ABEND.

The response time for a transaction that has ended abnormally is typically less than that of a successfully completed transaction. Thus, if the response time of a transaction is very small compared to the response times of other transactions of the same class that are completed successfully, then it is reasonable to suspect that the transaction has had a soft ABEND. Soft ABEND detection is important, and two important aspects of this phenomenon are:

It may be possible to identify a single transaction as a soft ABEND because its response time is very unlikely when compared with the response times of successfully completed transactions.

It may be possible to determine the probability overall of a soft ABEND based on a change in the observable performance data, such as a change in the response time histogram.

In general, the response time distribution of soft ABENDs may not necessarily be much different from the response time distribution of successful transactions. In this case, soft ABEND detection is very difficult.

Figure 8:
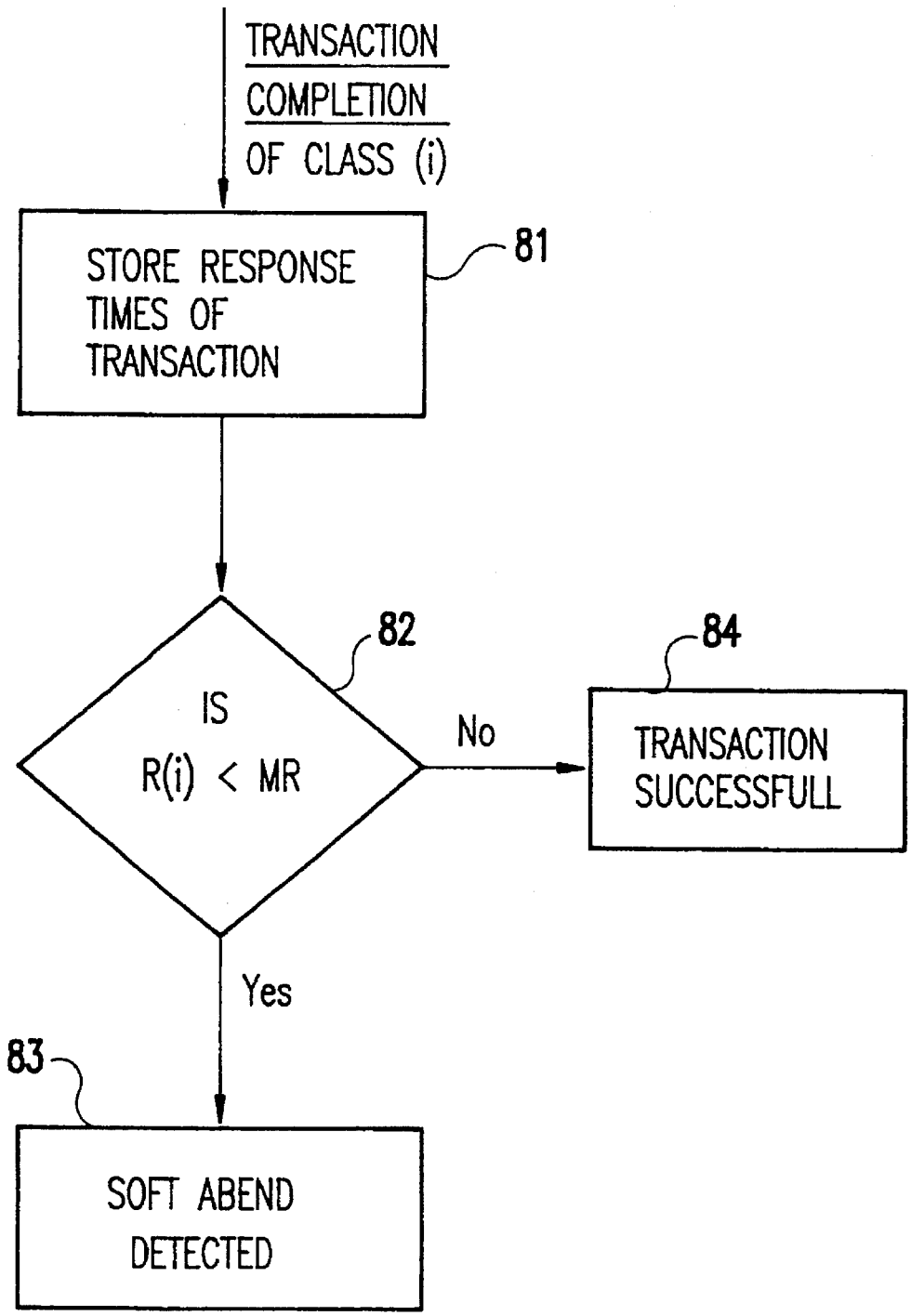
FIG. 8 is a flow diagram of the logic of the soft ABEND detection process implemented by the invention.

For the case that soft ABENDs result in response times that are very different from those of successful transaction completions, the general algorithm implemented by the invention as illustrated in the flow diagram of FIG. 8 will detect individual soft ABENDs. In function block 81, for each class, the response times of a large number of successfully completed transactions for that class are stored. When the router receives a return code indicating that a transaction has completed successfully, the response time of that transaction is compared in decision block 82 with response times of other transactions in the same class. If the response time is very different, then the transaction is judged to be a soft ABEND in function block 83, and this soft ABEND is used in the estimation of the transaction failure probability. If the response time is similar to response times of other transactions in the same class, the transaction is declared successful in function block 84.

Figure 9:
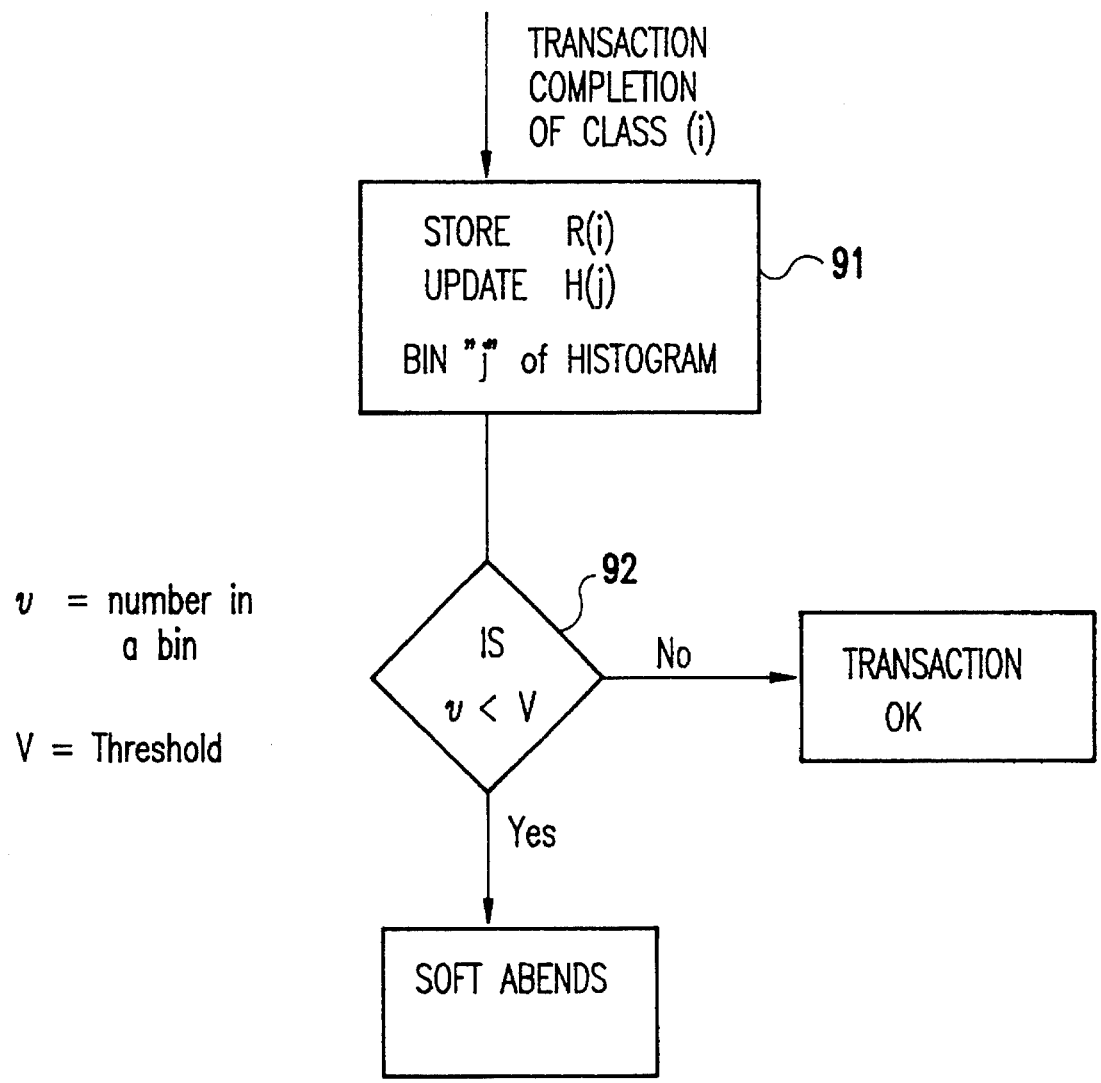
FIG. 9 is a flow diagram of the logic of the histogram model for the soft ABEND detection implemented by the invention.

FIG. 9 is a flow diagram showing in more detail a preferred algorithm using a histogram model for detecting soft ABENDS. In this algorithm, a histogram for the response times of successful transaction completions is maintained in function block 91. Specifically, Store N response times for a particular transaction class, and let T be the maximum response time.

Choose a bin size t for the response time. Time from 0 to T is divided into bins, where the ith bin is the time interval between time i*t and time (i+1)*t.

The histogram is a function h(i), where h(i) is the number of transactions in bin i. The function h(i) is defined over integers from 0 to $\lceil T/t \rceil$, where $\lceil\ \rceil$ represents the ceiling function. A response time R contributes to h(i) if i*t<R≤(i+1)*t.

A test is made in decision block 92 to determine those transaction completions that have a response time that corresponds to a probability of less than a set threshold computed from the histogram to identify soft ABENDs. Specifically, Select a p, 0≤p≤1, and let v=pN. The value p is interpreted to be a probability. If there are less than v response time observations in a particular bin, then transactions with response times falling into that bin are considered of such low probability (<p) that they are identified as being soft ABENDs.

While the transaction processing system is running, if a transaction has a response time r that falls into the ith bin and h(i)<v, then that transaction is identified as a soft ABEND.

The above procedure can be modified to update the histogram h(i) periodically.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for routing transactions in a transaction processing system in which servers can fail comprising the steps of:

estimating a probability of a transaction failure for each server and each transaction class;

estimating an arrival rate of each transaction class at each router and at each server;

determining a queue length of transactions of each class waiting at each server;

determining failure probabilities for each server in the transaction processing system based on the estimates of a probability of a transaction failure and the arrival rate for each transaction class and a number of transactions of each class waiting at the server;

routing transactions to servers that have failure rates below a predetermined threshold; and if multiple servers satisfy the predetermined threshold, then choosing a server using statistical data about transaction arrival rates, response times, failure probabilities, and queue lengths of transactions per class at the servers.

2. A method for routing transactions in a transaction processing system in which servers can fail comprising the steps of:

estimating a probability of a transaction failure for each server and each transaction class;

estimating an arrival rate of each transaction class at each router and at each server;

determining a queue length of transactions of each class waiting at each server;

determining failure probabilities for each server in the transaction processing system based on the estimates of a probability of a transaction failure and the arrival rate for each transaction class and a number of transactions of each class waiting at the server;

routing transactions to servers that have failure rates below a predetermined threshold; and detecting a decrease in a failure rate of servers that are ignored in the routing step because they were considered too faulty.

3. The method recited in claim 2 further comprising the step of detecting the presence of soft abnormal endings of transactions at each server, a soft abnormal ending occurring when a server returns a code that indicates success for a transaction that has actually failed.

4. The method recited in claim 3 wherein said step of detecting the presence of soft abnormal endings of transactions is performed by the step of comparing response times of transactions to statistical data of response times for successful transactions.

5. The method recited in claim 4 wherein the statistical data is a histogram of observed response times.

6. The method recited in claim 4 further comprising the steps of:

setting a threshold p and defining v to be p times the number of observations used to make the histogram; and identifying a transaction with a response time that falls into a histogram bin that has less than v elements as a soft abnormal ending.

7. A method for routing transactions in a transaction processing system in which servers can fail comprising the steps of:

estimating a probability of a transaction failure for each server and each transaction class;

estimating an arrival rate of each transaction class at each router and at each server;

determining a queue length of transactions of each class waiting at each server;

determining failure probabilities for each server in the transaction processing system based on the estimates of a probability of a transaction failure and the arrival rate for each transaction class and a number of transactions of each class wailing at the server;

routing transactions to servers that have failure rates below a predetermined threshold; and monitoring H(i,j), the number of class i transactions at server j.

8. Method for routing transactions in a transaction processing system in which servers can fail and wherein transactions of a certain class are not currently being routed to one or more servers because of a high failure rate, comprising the steps of:

estimating a probability of a transaction failure for each server and each transaction class;

estimating an arrival rate of each transaction class at each router and at each server;

determining a queue length of transactions of each class waiting at each server;

determining failure probabilities for each server in the transaction processing system based on the estimates of a probability of a transaction failure and the arrival rate for each transaction class and a number of transactions of each class waiting at the server;

routing transactions to servers that have failure rates below a predetermined threshold;

sending a limited number of transactions to said one or more servers; and determining if a failure rate of said one or more servers has decreased based on a return of a code indicating a success or failure of transactions sent to the systems.

9. The method recited in claim 8 where in the step of determining if a failure rate has decreased comprises the steps of:

waiting for a specified number of transaction completions to occur;

recomputing a transaction failure rate for said one or more servers assuming that a transaction has completed successfully, even though no transaction has actually been routed to said one or more servers; and as an estimated failure probability decreases, sending a transaction to said one or more servers to test of said one or more servers has improved.

* * * * *